United States Patent
Kleiner

(10) Patent No.: US 6,847,997 B1
(45) Date of Patent: Jan. 25, 2005

(54) COMMUNICATIONS NETWORK UTILIZING TRANSMITTER AND CHANNEL DIVERSITY TO MITIGATE PATH IMPAIRMENTS

(75) Inventor: Norbert Kleiner, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/553,232

(22) Filed: Apr. 19, 2000

(51) Int. Cl.⁷ .............................................. G06F 15/173
(52) U.S. Cl. ....................... 709/224; 709/224; 709/227; 455/450
(58) Field of Search ................................. 709/200, 201, 709/203, 217, 218, 219, 220, 223, 224; 455/452.16, 452.2, 453, 450

(56) References Cited

U.S. PATENT DOCUMENTS

| | | | |
|---|---|---|---|
| 5,216,427 A | 6/1993 | Yan et al. | 342/352 |
| 5,475,735 A | 12/1995 | Williams et al. | 379/59 |
| 5,861,965 A | 1/1999 | Koren et al. | 359/123 |
| 5,862,485 A | 1/1999 | Linneweh, Jr. et al. | 455/450 |
| 5,884,142 A | 3/1999 | Wiedeman et al. | 455/12.1 |
| 5,963,860 A | 10/1999 | Muths et al. | 455/412 |
| 5,966,373 A | 10/1999 | Stephenson et al. | 370/335 |
| 5,987,062 A * | 11/1999 | Engwer et al. | 375/225 |
| 5,991,618 A | 11/1999 | Hall | 455/425 |
| H1837 H | 2/2000 | Fletcher et al. | 455/433 |
| 6,029,057 A | 2/2000 | Paatelma et al. | 455/277.2 |
| 6,035,178 A | 3/2000 | Chennakeshu et al. | 455/12.1 |
| 6,058,289 A * | 5/2000 | Gardner et al. | 340/7.32 |
| 6,198,910 B1 * | 3/2001 | Hanley | 455/67.1 |
| 6,216,002 B1 * | 4/2001 | Holmring | 455/436 |
| 6,229,792 B1 * | 5/2001 | Anderson et al. | 370/280 |
| 6,272,353 B1 * | 8/2001 | Dicker et al. | 455/517 |
| 6,330,429 B1 * | 12/2001 | He | 455/67.11 |
| 6,347,217 B1 * | 2/2002 | Bengtsson et al. | 455/67.7 |
| 6,370,126 B1 * | 4/2002 | De Baere et al. | 370/316 |

* cited by examiner

Primary Examiner—Frantz B. Jean
Assistant Examiner—Yasin Barqadle
(74) Attorney, Agent, or Firm—Frank J. Bogace

(57) ABSTRACT

Communications path impairments are mitigated within a wireless communications system (10) comprising fixed, mobile, and portable subscriber units (SUs 1–N), server nodes (S1–SN), and a network operations center (NOC 2). Each SU can be served by at least two different server nodes, each communicating over a different channel. The SUs and/or the server nodes periodically evaluate the quality of the SU communications links and determine the link having optimum quality. The SU or the server node informs the NOC of the determination. Subsequent communications with the SU during the period are conducted using the optimum communications link. In the event of a temporary path impairment, an alternate communications link is promptly established to maintain uninterrupted communications with the SU. In another embodiment, the NOC performs the quality evaluation and/or determines the optimum communications link to the SU. The NOC communicates with the server nodes over separate communications links.

20 Claims, 5 Drawing Sheets

COMMUNICATIONS NETWORK UTILIZING TRANSMITTER AND CHANNEL DIVERSITY TO MITIGATE PATH IMPAIRMENTS

FIELD OF THE INVENTION

This invention relates generally to communications systems and, in particular, to systems and methods for mitigating signal path impairments in a wireless communications system.

BACKGROUND OF THE INVENTION

There is an ever increasing demand for communications infrastructure that can support inexpensive, high-speed communications to every residential and business address that desires it. As one example, the use of the Internet for commerce, education, entertainment, communications, and many other purposes is quickly developing. There is likewise an increasing interest in providing entertainment and other services to residential and business customers that require moving large amounts of data very quickly, i.e. that have high band-width requirements, such as video-on-demand, high fidelity audio, high definition television, computer software, documents, medical X-ray charts, digital photography, and the like.

It is well known to implement the needed communications infrastructure by interconnecting communications nodes using wires and cables. However, cabling is expensive and time-consuming to deploy, and it has not been able to fulfill the expanding demand for high-speed communications services.

Wireless communications systems provide a relatively low cost alternative to wire-based communications networks, and they are quicker to deploy. One known wireless network architecture is the wireless local network having one or more base stations or server nodes distributed throughout a region of system users. Each system user has wireless equipment for communicating bi-directionally with a server node. This type of wireless network is sometimes referred to as a "last mile" network, because information content can be distributed from a high bandwidth source by cable to a server node that is in the neighborhood of the system user and then distributed the "last mile" via a wireless link between the server node and the system user's equipment.

The known wireless local networks are subject to various types of impairments of the communications channel(s). Some impairments are pre-existing, e.g. geographical features such as mountains, high buildings, etc. Other impairments develop after establishment of the wireless local network, e.g. foliage growth, new building construction, etc. Still other impairments are transitory, e.g. power disruptions; maintenance down-time; weather conditions such as fog, heavy rain, dust storms, lightning storms, solar storms (to the extent their effect may be localized by line-of-sight conditions); and so forth.

Accordingly, there is a significant need for systems and methods that can mitigate signal path impairments in a wireless communications system.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

Figure 1:
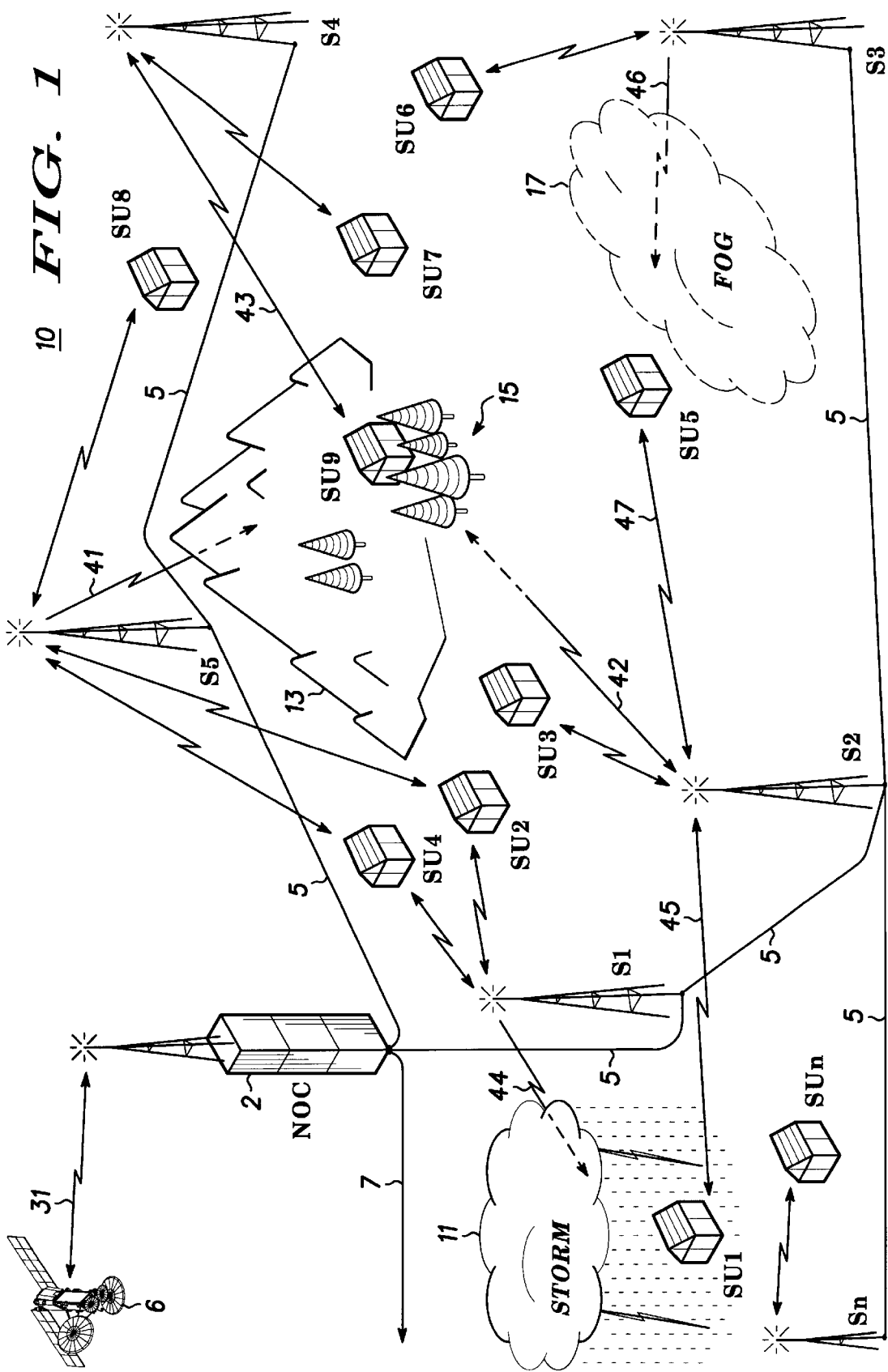
FIG. 1 depicts a simplified diagram of a wireless communications system, including a wireless local network, with which the present invention may be practiced.

FIG. 1 depicts a simplified diagram of a wireless communications system, including a wireless local network 10, with which the present invention may be practiced. "Wireless" is defined herein to mean radio frequency, including microwave and millimeter wave; optical, including laser; and any other type of communications link implemented without the use of wires or cables. The present invention can be used with any local or regional wireless network. In the embodiment depicted in FIG. 1, wireless local network 10 can be used to provide a basic communications system where no infrastructure presently exists, or it can be used to supplement an existing communications system. Wireless local network 10 can readily adapt itself to sudden and rapid surges in subscriber demand for broadband services. Even more significantly, wireless local network 10 can readily mitigate impairments in the communications links, whether of the long-term, medium-term, or short-term variety.

In one embodiment, wireless local network 10 comprises a plurality of subscriber units (SU1–SUN). A "subscriber unit" is defined herein to mean any wireless communications device. While in one embodiment of the present invention an SU is a wireless network device, such as a radio frequency (RF) or optical modem, that is coupled to a computer located in a residential or commercial building, in other embodiments it can take the form of other devices capable of two-way wireless communications, such as a cellular telephone, pager, personal digital assistant or other type of portable computer, two-way radio, selective communication device, transponder, telemetry device, or other types of fixed, mobile, and portable computing and/or communicating devices.

Wireless local network 10 also includes a plurality of server nodes S1–SN. Server nodes S1–SN are geographically dispersed within a region encompassing SUs 1–N, preferably in a manner that will provide optimum coverage to all SUs at an economical cost. While server nodes S1–SN are depicted as including radio tower antennas, they can be implemented in any suitable wireless technology, antenna configuration, and signal beam pattern. For example, they could be implemented with narrow-beam antenna patterns or omni-directional antenna patterns. They can utilize phased-array antennas, parabolic antennas, tower antennas, laser transceivers, or any other suitable elements, however and wherever situated, for sending and receiving wireless transmissions.

SUs 1–N communicate wirelessly with server nodes S1–SN. Each SU 1–N communicates with at least two server nodes S1–SN. Some SUs can communicate with more than two server nodes S1–SN. Each server node S1–SN communicates using a different channel. Any of many known channel diversity schemes can be employed, such as Frequency Division Multiple Access (FDMA), Time Division Multiple Access (TDMA), Code Division Multiple Access (CDMA), or other channel diversity schemes or combinations thereof, e.g. wavelength division for optical communications.

SUs 1–N generally communicate over line-of-sight transmission paths with server nodes. This is true particularly for optical transmission paths, but it can also be applicable to RF transmission paths. As mentioned earlier, wireless communications channel are subject to various types and levels of impairments. Some are permanent, e.g. those involving geographical features such as mountains, high buildings, etc. Thus, potential wireless link 41 between server node S5 and SU 9 is permanently blocked by mountain 13.

Other impairments develop after establishment of the wireless local network, e.g. foliage growth, new building construction, etc. For example, a potential wireless link 42 between server node S2 and SU9 is blocked by trees 15. However, SU9 can still establish a wireless link 43 with server node S4 and another (not shown) with server node S1.

Still other impairments are transitory, e.g. power disruptions; maintenance down-time; weather conditions such as fog, heavy rain, dust storms, lightning storms, solar storms (to the extent their effect may be localized by line of sight conditions); and so forth. For example, a potential wireless link 44 between server node S1 and SU1 is blocked by a rain storm. However, SU1 can still establish a wireless link 45 with server node S2 and another (not shown) with server node SN.

As another example of a transitory link impairment, potential wireless link 46 between server node S3 and SU5 is blocked by fog lying between the two nodes. However, SU5 can still establish a wireless link 47 with server node S2 and another (not shown) with server node S4.

Wireless local network 10 further includes one or more network operations centers (NOC 2). In one embodiment, NOC 2 is coupled by cable 5 to all server nodes S1–SN. In another embodiment, NOC 2 can be coupled to server nodes S1–SN via wireless links, or by a combination of cable links and wireless links. If implemented with wireless links, they can be of any suitable type mentioned above. NOC 2 communicates with server nodes S1–SN over a different communications channel than those used by server nodes S1–SN to communicate with SUs 1–N, according to one embodiment.

NOC 2 is coupled to the Internet and/or other communications networks that are external to local wireless local network 10. For example, NOC 2 can be coupled via cable link 7 to another terrestrial communications node, and/or NOC 2 can be coupled via wireless link 31 to satellite 6. A "satellite" is defined herein to mean a man-made object or vehicle intended to orbit Earth and includes both geostationary and orbiting satellites and/or combinations thereof including low earth orbiting (LEO) satellites.

NOC 2 is a network control node that performs various communication and control functions to coordinate the operation of server nodes S1–SN within the wireless local network 10.

As will be discussed further below, SUs 1–N and/or server nodes S1–SN periodically evaluate the quality of the SU communications links and determine the link having optimum quality. The SU or the server node informs the NOC of the determination. Subsequent communications with the SU during the period are conducted by just one server node, using the optimum communications link. In the event of a temporary path impairment, an alternate communications link is promptly established with another server node to maintain uninterrupted communications with the SU.

The network architecture is flexible, in that the channel assessment and selection functions, such as quality measurement, optimum quality determination, and selection of a particular communications link to an SU, can be performed within one node, such as NOC2, or they can be distributed within the wireless local network and performed by the server nodes S1–SN or by each SU 1–N, or they can be performed by a combination of the above nodes.

Figure 2:
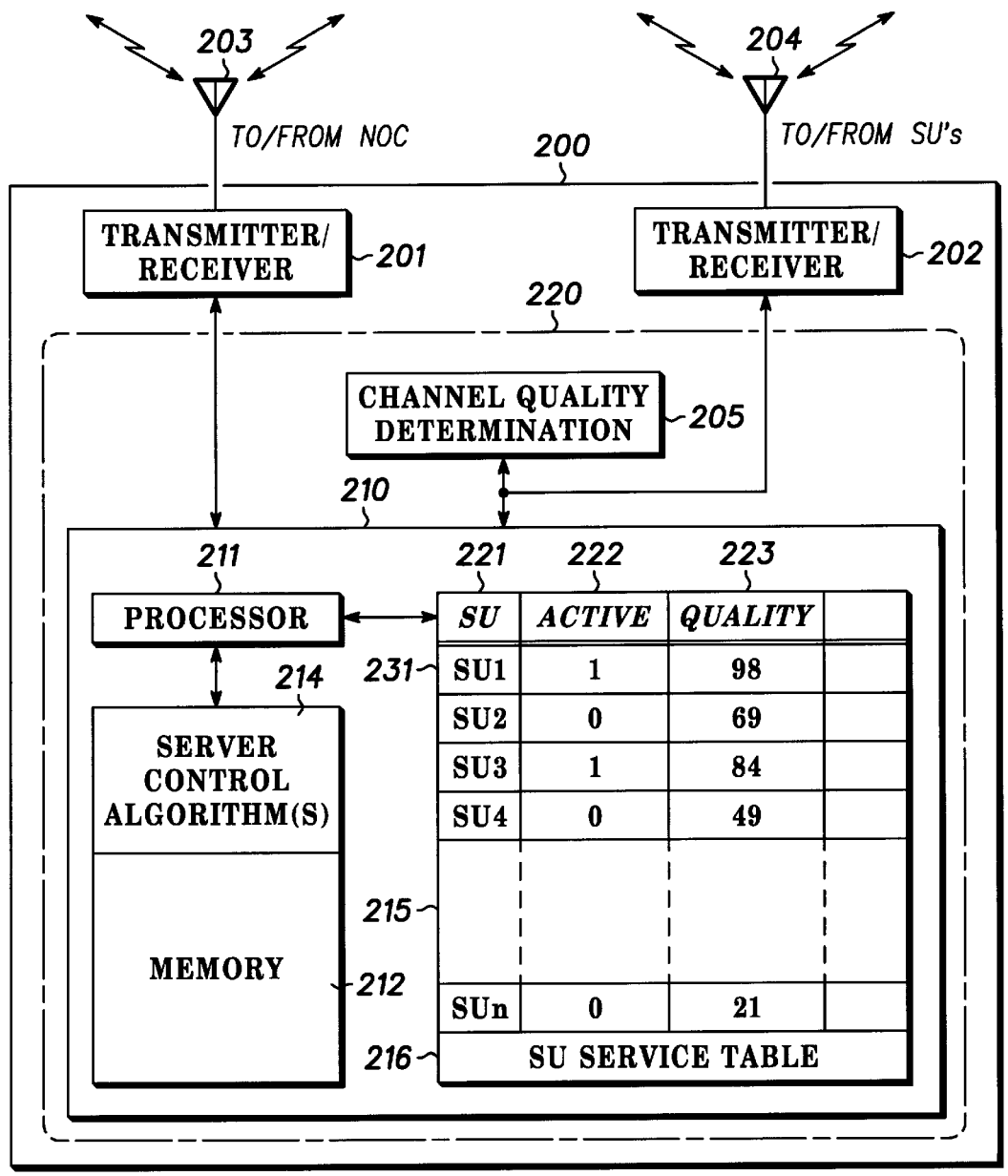
FIG. 2 depicts a block diagram of a server node suitable for use in one embodiment of the present invention.

FIG. 2 depicts a block diagram of a server node 200 suitable for use in one embodiment of the present invention. Server node 200 comprises a transceiver 201 that receives and transmits communications, using antenna 203, over link 5 (FIG. 1) from/to NOC 2 and/or other server nodes. Link 5 can be a wireless link, a cabled link, or a combination of wireless and cabled links. If a cabled link (as illustrated in FIG. 1), an appropriate network interface circuit can be substituted for transceiver 201 in server node 200. Transceiver 201 (or a network interface circuit) is coupled to data processing system 210, described below.

Server node 200 further comprises a transceiver 202 that receives and transmits communications, using antenna 204, over various wireless links (FIG. 1) from/to various SUs. Transceiver 202 is coupled to data processing system 210, described below.

Server node 200 also includes a control module 220. Control module 220 includes a channel quality determination element 205 and data processing system 210.

Channel quality determination element 205 measures the quality of the communications link between server node 200 and each SU with which server node 200 can potentially communicate. Server nodes S1–SN (FIG. 1) are distributed throughout wireless local network 10 in such a manner as to enable each SU1–SUN to potentially communicate with at least two, and possible three or more, different server nodes S1–SN in order to provide adequate diversity of available communications links in the event that one or more communications links become impaired. In one embodiment, each server node S1–SN (FIG. 1) communicates with the SUs that have been assigned to communicate with it, using an appropriate channel diversity scheme, as mentioned earlier.

Channel quality determination element 205 is coupled to transceiver 202 that is communicating with SUs via antenna 204. Channel quality determination element 205 is controlled by data processing system 210. Data processing system 210 includes a processor or other processing element 211, and data processing system 210 also includes a memory that comprises at least a portion 212 that contains server control algorithms 214 and a portion 215 that contains an SU Service Table 216.

Channel quality determination element 205 periodically measures the quality of the communications channel or communications link between server node 200 and each of the SUs that server node 200 is potentially serving. The quality of each channel is measured according to an appropriate sampling scheme, and a quality value is stored in the SU Service Table 216 in memory portion 215 in data processing system 210.

The link quality can be determined in any suitable known manner. For example, link quality can be measured as a function of signal strength, bit error rate, and/or block error rate. Additional or alternative ways of measuring link quality will be readily apparent to those of ordinary skill.

When a server node is carrying on normal communications with an SU, only one communications link to that SU is currently active. When link quality is being measured and determined for a particular communications link, if that link is the currently active link, the measurements are based upon current or recent communications over that link. However, if that link is not the currently active link, a communications exchange must be initiated over that link, and then the measurements are based upon such communications exchange. The exchange can be initiated by an SU, a server node, or the NOC.

SU Service Table 216 comprises a list of SUs with which server node 100 can communicate. Although in FIG. 2, SU Service Table 216 is shown as comprising a list of all SUs (SU1–SUN) in the wireless local network, SU Service Table 216 may only contain a subset of all SUs. Column 221 of SU Service Table 216 contains an identifier for each SU, e.g. SU1, SU2, . . . , SUN. Column 222 contains an Active status indicator regarding a communications link with the corresponding SU, wherein a "1" indicates active status and a "0" indicates inactive status. Column 223 contains a quality value for a communications link with each of the SUs stored in SU Service Table 216. For example, in row 231, the communications link with SU1 is indicated as being active and having a quality value of "98".

Each memory portion 212, 215 can be implemented as a computer-readable storage medium that stores computer programs and data structures comprising variables, tables, and databases, that are executed, accessed, updated, and manipulated during the operation of server node 200. With particular regard to the present invention, memory portion 212 stores server control algorithms in the form of computer program instructions and data structures that, when executed, perform all operations necessary to carry out the herein-described functions of server node 200 within the wireless local network, including controlling the evaluation of and selection of communications links between SUs and server node 200. Included in the performance of such tasks is the storage of entries into and retrieval of entries from the SU Service Table 216 in memory portion 215.

Those skilled in the art will appreciate that the particular structure of server node 200 is a matter of design choice and that server node 200 can be implemented in other ways that will be apparent in view of the description of the function and operation of server node 200 contained herein.

While in the embodiment illustrated in FIG. 2 the channel quality measuring and determination functions are illustrated as carried out by data processing system 210, in another embodiment they can be carried out with the data processing system 410 (FIG. 4) of the network operations center 400.

Figure 3:
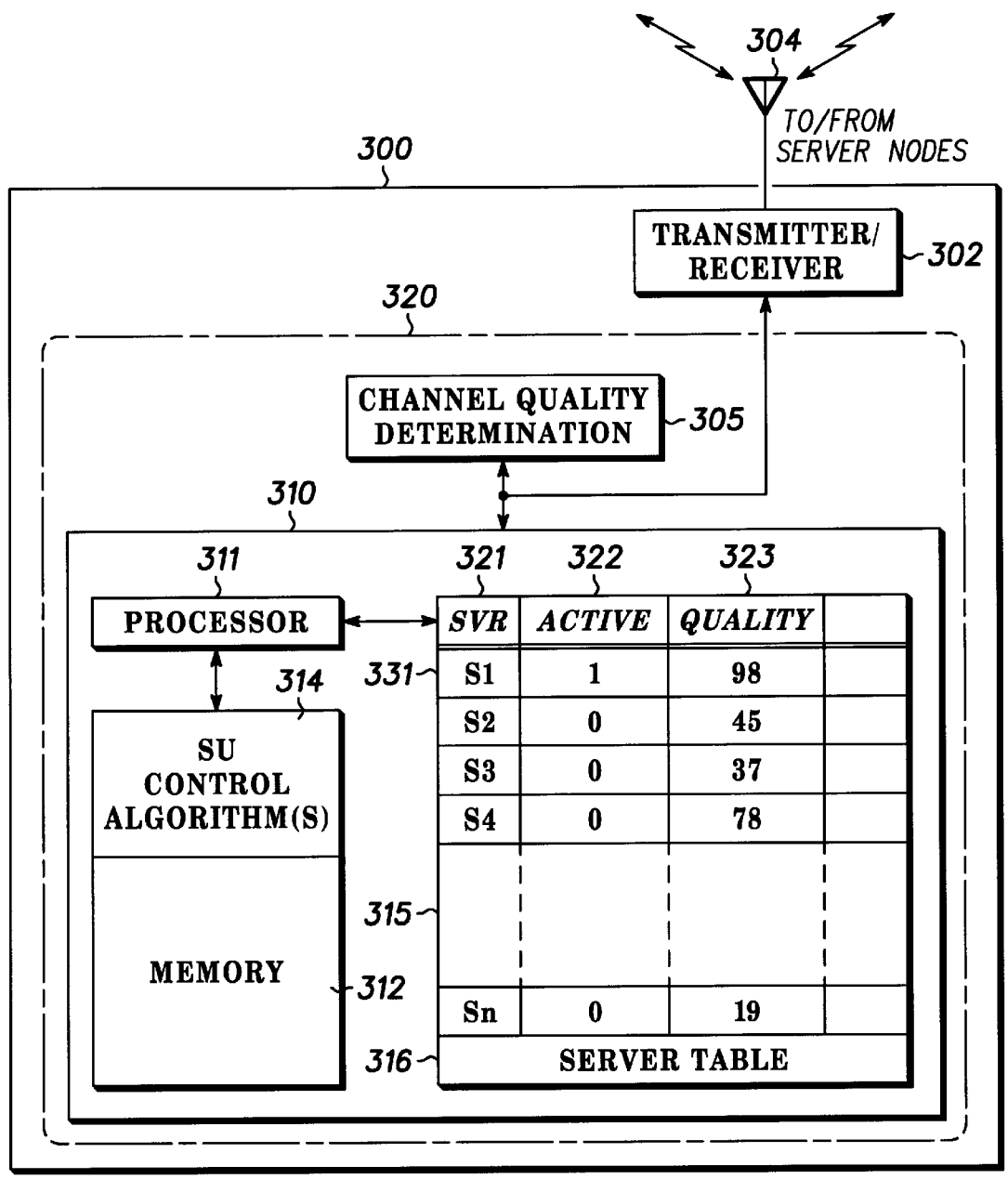
FIG. 3 depicts a block diagram of a subscriber unit suitable for use in one embodiment of the present invention.

FIG. 3 depicts a block diagram of a subscriber unit (SU) 300 suitable for use in one embodiment of the present invention. SU 300 comprises a transceiver 302 that receives and transmits communications, using antenna 304, over different communications links from/to two or more server nodes S1–SN (FIG. 1). Transceiver 302 is coupled to data processing system 310, described below.

SU 200 also includes a control module 320. Control module 320 includes a channel quality determination element 305 and data processing system 310.

Channel quality determination element 305 measures the quality of the communications link between SU 300 and each server node with which SU 300 can potentially communicate. As mentioned earlier, server nodes S1–SN (FIG. 1) are distributed throughout wireless local network 10 in such a manner as to enable each SU1–SUN to potentially communicate with at least two, and possible three or more, different server nodes S1–SN in order to provide adequate diversity of available communications links in the event that one or more communications links become impaired.

Channel quality determination element 305 is coupled to transceiver 302 that is communicating with two or more server nodes via antenna 304. Channel quality determination element 305 is controlled by data processing system 310. Data processing system 310 includes a processor or other processing element 311, and data processing system 310 also includes a memory that comprises at least a portion 312 that contains SU control algorithms 314 and a portion 315 that contains a Server Table 316.

Channel quality determination element 305 periodically measures the quality of the communications channel between SU 300 and each of the server nodes that subscriber unit 300 can communicate with. The quality of each channel is measured according to an appropriate sampling scheme, and a quality value is stored in Server Table 316 in memory portion 315 in data processing system 310.

Server Table 316 comprises a list of server nodes with which SU 300 can communicate. Although in FIG. 3, Server Table 316 is shown as comprising a list of all server nodes (S1–SN) in the wireless local network, Server Table 316 may only contain a subset of all server nodes. Column 321 of Server Table 316 contains an identifier for each server node, e.g. S1, S2, . . . , SN. Column 322 contains an Active status indicator regarding a communications link with the corresponding server node, wherein a "1" indicates active status and a "0" indicates inactive status. Column 323 contains a quality value for a communications link with each of the server nodes stored in Server Table 316. For example, in row 331, the communications link with server node S1 is indicated as being active and having a quality value of "98".

Each memory portion 312, 315 can be implemented as a computer-readable storage medium that stores computer programs and data structures comprising variables, tables, and databases, that are executed, accessed, updated, and manipulated during the operation of SU 300. With particular regard to the present invention, memory portion 312 stores server control algorithms in the form of computer program instructions and data structures that, when executed, perform all operations necessary to carry out the herein-described functions of SU 300 within the wireless local network. Included in the performance of such tasks is the storage of entries into and retrieval of entries from the Server Table 316 in memory portion 315.

Those skilled in the art will appreciate that the particular structure of SU 300 is a matter of design choice and that SU 300 can be implemented in other ways that will be apparent in view of the description of the function and operation of SU 300 contained herein.

While in the embodiment illustrated in FIG. 3 the channel quality measuring and determination functions are illustrated as carried out by data processing system 310, in another embodiment they can be carried out with the data processing system 210 of a server node 200 or by data processing system 410 (FIG. 4) of a network operations center 400.

Figure 4:
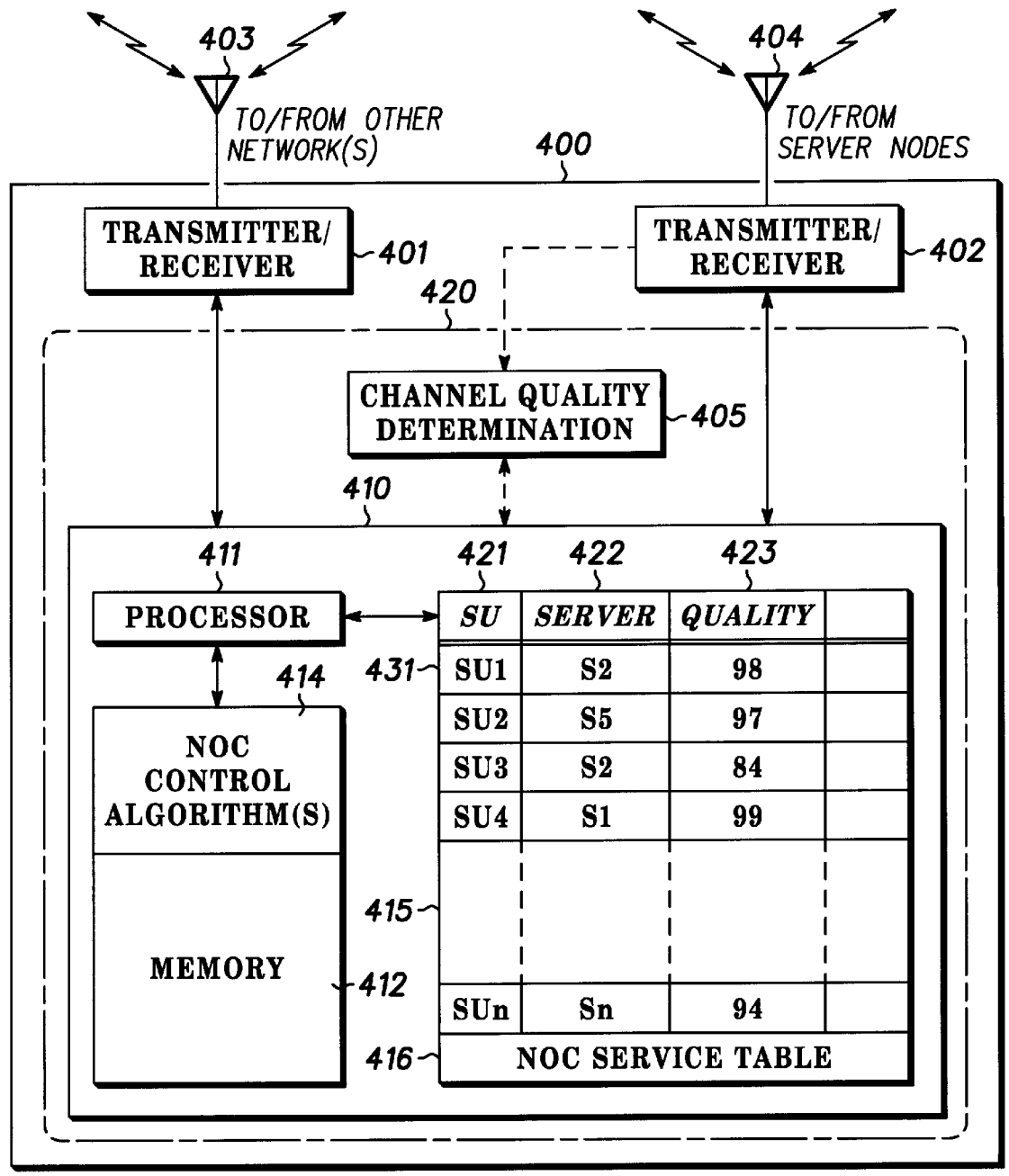
FIG. 4 depicts a block diagram of a network operations center suitable for use in one embodiment of the present invention.

FIG. 4 depicts a block diagram of a network operations center 400 suitable for use in one embodiment of the present invention. Network operations center (NOC) 400 comprises a transceiver 401 that receives and transmits communications, using antenna 403, over one or more links with other networks, such as the Internet. For example, NOC 400 can communicate via link 31 (FIG. 1) from/to satellite 6. NOC 400 can be linked to other networks via a wireless link such as link 31, a cabled link such as link 7 (FIG. 1), or a combination of wireless and cabled links. If a cabled link is used (as illustrated by cable 7 in FIG. 1), an appropriate network interface circuit can be provided in NOC 400, either together with or as a substitute for transceiver 401. Transceiver 401 (or a network interface circuit) is coupled to data processing system 410, described below.

NOC 400 also comprises a transceiver 402 that receives and transmits communications, using antenna 404, over link 5 (FIG. 1) from/to server nodes S1–SN. Link 5 can be a wireless link, a cabled link, or a combination of wireless and cabled links. If a cabled link (as illustrated by link 5 in FIG. 1), an appropriate network interface circuit can be provided in server node 200, either together with or as a substitute for transceiver 402. Transceiver 402 (or a network interface circuit) is coupled to data processing system 410, described below.

NOC 400 also includes a control module 420. Control module 420 includes data processing system 410, and control module 420 can also include an optional channel quality determination element 405 in one embodiment wherein NOC 400, rather than SUs or server nodes, carries out the channel quality measuring and determination functions, as discussed below.

NOC 400 performs various communication and control functions to coordinate the operation of server nodes S1–SN within the wireless local network 10. As previously discussed, SUs 1–N and/or server nodes S1–SN periodically evaluate the quality of the SU communications links and determine the link having optimum quality. The SU or the server node informs NOC 400 of the determination. Subsequent communications with the SU during the period are conducted by just one server node, using the optimum communications link. In the event of a temporary path impairment, an alternate communications link is promptly established with another server node to maintain uninterrupted communications with the SU.

The operation of NOC 400 is controlled by data processing system 410. Data processing system 410 includes a processor or other processing element 411, and data processing system 410 also includes a memory that comprises at least a portion 412 that contains NOC control algorithms 414 and a portion 415 that contains a NOC Service Table 416.

Channel quality values received via transceiver 402 from SUs and/or server nodes are stored in the NOC Service Table 416 in memory portion 415 in data processing system 410. NOC Service Table 416 can comprise a list of the SUs (SU1–SUN) in the wireless local network. Although in FIG. 4, NOC Service Table 416 is shown as comprising a list of all SUs (SU1–SUN) in the wireless local network, NOC Service Table 416 may only contain a subset of all SUs, in the event that there is more than one NOC in the wireless local network.

Column 421 of NOC Service Table 416 contains an identifier for each SU, e.g. SU1, SU2, . . . , SUN. Column 422 contains an identifier (e.g. S1–SN) for the server node that is currently assigned to communicate with the corresponding SU. Column 423 contains a quality value for the current communications link of each SU stored in NOC Service Table 416. For example, in row 431, the communications link between SU1 and server node S2 is indicated as having a quality value of "98".

Each memory portion 412, 415 can be implemented as a computer-readable storage medium that stores computer programs and data structures comprising variables, tables, and databases, that are executed, accessed, updated, and manipulated during the operation of NOC 400. With particular regard to the present invention, memory portion 412 stores NOC control algorithms in the form of computer program instructions and data structures that, when executed, perform all operations necessary to carry out the herein-described functions of NOC 400 within the wireless local network. Included in the performance of such tasks is the storage of entries into and retrieval of entries from the NOC Service Table 416 in memory portion 415.

Those skilled in the art will appreciate that the particular structure of NOC 400 is a matter of design choice and that NOC 400 can be implemented in other ways that will be apparent in view of the description of the function and operation of NOC 400 contained herein.

In an embodiment in which NOC 400, rather than SUs or server nodes, carries out the channel quality measuring and determination functions, NOC 400 also includes a channel quality determination element 405 that periodically measures the quality of the communications links between each SU and the server nodes with which each SU can potentially communicate and determines the link having optimum qual-ity for each SU. Channel quality determination element 405 is coupled to transceiver 402 that is communicating with server nodes via antenna 404. The quality of each communications link is measured according to an appropriate sampling scheme, and a quality value is stored in the NOC Service Table 416 in memory portion 415 in data processing system 210. In this embodiment, NOC Service Table 416 would be suitable modified to store the additional data, e.g. by providing an SU Service Table similar to SU Service Table 216 for each server node in the wireless local network that is controlled by NOC 400.

Although NOF 400 is illustrated as a separate facility within wireless local network 10, in other embodiments its function can be integrated into one or more other facilities, such as a server node S1–SN.

Figure 5:
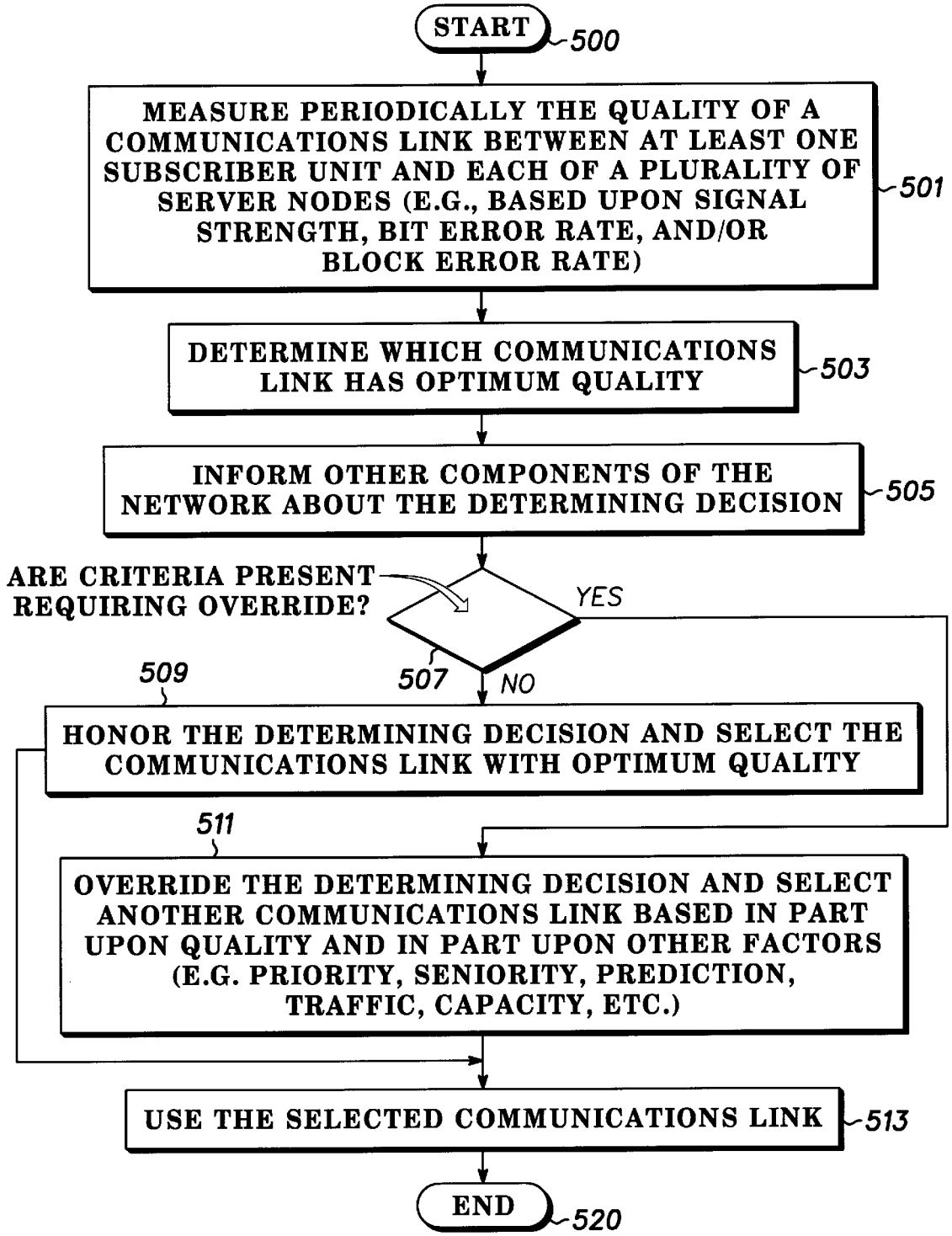
FIG. 5 shows a flow chart for a method of operating a wireless local network wherein path impairments can be mitigated, according to one embodiment of the invention.

FIG. 5 shows a flow chart for a method of operating a wireless local network wherein path impairments can be mitigated, according to one embodiment of the invention. The method starts in block 500. In 501, the quality of a communications link between at least one SU and each of a plurality of server nodes is periodically measured. It will be understood that a typical wireless local network can comprise thousands of SUs, each communicating with at least two server nodes and possibly with three or more server nodes. The assessment of link quality can be based upon any suitable factor or upon a combination of factors. For example, signal strength, bit error rate, and/or block error rate can be used to determine link quality. Other link quality measurements will be readily apparent to those of ordinary skill.

In 503, a determination is made as to which communications link has superior or optimum quality. This determination can be based upon any suitable criterion or upon a combination of criteria. For example, assuming that signal strength, bit error rate, and/or block error rate are used to measure link quality, an algorithm for determining the optimum quality link could be based upon a formula that weights one of the measured link quality values higher than the other(s), for example weighting bit error rate relatively higher than signal strength.

In 505, other components of the network are informed about the determining decision. For example, in an embodiment in which the determining decision is made by an SU, the server node and/or the NOC can be informed of the decision. In an embodiment in which the determining decision is made by a server node, the SU and/or the NOC can be informed of the decision. In an embodiment in which the determining decision is made by the NOC, the server node and/or the SU can be informed of the decision.

In 507, an evaluation is made whether any criteria are present that require an override of the determining decision. An override may be necessary to avoid overloading a server node. Such criteria, for example, could include seniority (e.g. maintaining communications links with existing SUs and not establishing a new communications link with an SU just starting up); priority (e.g. establishing communications links to SUs according to a priority scheme and not establishing a new communications link with an SU having relatively low priority); prediction (e.g. not establishing a new communications link based upon predictive factors such as traffic loading patterns, weather, seasonal and diurnal patterns); capacity (e.g. how much communications traffic a particular server node can handle); and other criteria. If overriding criteria are present, the method goes to 511; otherwise, it goes to 509.

In 509, the determining decision is honored, and the communications link having superior or optimum quality is selected. According to one embodiment, subsequent communications with the SU are ordered to be conducted over the communications link having superior or optimum quality. Such an order can be generated by the NOC, by a server node, or by an SU, depending upon the particular architecture of the wireless local network. If the order is to be generated by a server node, an order controlling the server node to do so can be transmitted to the server node from the NOC. If the order is to be generated by an SU, an order controlling the SU to do so can be transmitted to the SU from either the NOC or a server node.

From 509 the method proceeds to 513.

In 511, the determining decision is overridden, and another communications link is selected. The selection of the other communications link is based in part upon quality and in part upon other factors, such as those mentioned above. From 511 the method proceeds to 513.

In 513, the selected communications link is thereafter used. The method ends in 520.

It will be understood by those skilled in the art that the operations of the methods shown and described herein can be carried out in a different order than those described with reference to FIG. 5.

It will also be understood that while the flowchart has "Start" and "End" blocks, in general the method that it depicts is continuously performed. Thus, if the link subsequently becomes impaired, or if one or more overriding criteria subsequently requires the link to be yielded in favor of one or more SUs requesting access to the server node providing the link, performance of the method will result in a new communications link being assigned to the SU whose current communications link has become impaired or otherwise made unavailable.

The particular operations depicted in FIG. 5 are merely illustrative of one embodiment of the invention, and other implementations will be apparent to those of ordinary skill in the art.

CONCLUSION

Thus there have been described above systems and methods for mitigating communications path impairments in a wireless local network. In the event of a communications path impairment, an alternate communications link is promptly established to maintain virtually uninterrupted communications with a subscriber unit.

The systems and methods are quite versatile and can be implemented in any type of wireless local network. As described herein, the advantages of the present invention will be apparent to those of skill in the art and will provide improved systems and methods for mitigating communications path impairments in a wireless local network.

While the invention has been described in terms of specific examples, it is evident that many alternatives and variations will be apparent to those skilled in the art based on the description herein, and it is intended to include such variations and alternatives in the claims.

What is claimed is:

1. A method of mitigating path impairments in a wireless communications system comprising at least one subscriber unit and a plurality of server nodes interconnected by a plurality of wireless communication links, the method comprising:

establishing one of the plurality of wireless communications links as an active link between the at least one subscriber unit and one of the plurality of server nodes;

measuring periodically the quality of the active link;

determining whether the active link provides superior quality of communications compared with the other links of the plurality of wireless communications links;

evaluating the results of the determining step according to criteria to determine if an override is necessary to prevent overloading one of the server nodes;

ordering subsequent communications with the subscriber unit to be over the active link having the optimum quality if an override is not necessary, and otherwise selecting another of the plurality of wireless communications links; and continuously performing the measuring, deter and evaluating steps to thereby assign a new one of the plurality of wireless communications links when the active link is yielded in response to the evaluating step.

2. The method recited in claim 1 wherein each communications link utilizes a different communications channel.

3. The method recited in claim 1 wherein each communications link is a wireless link, and wherein the subscriber units are from the group consisting of fixed subscriber units, mobile subscriber units, and portable subscriber units.

4. The method recited in claim 1 wherein determining is performed by the at least one subscriber unit.

5. The method recited in claim 4 wherein the communications system further comprises a network operations center coupled to the plurality of server nodes, the method further comprising:

the at least one subscriber unit communicating to the network operations center a determination of a communications link having optimum quality.

6. The method recited in claim 5, wherein;

the network operations center performs the evaluating step.

7. Method recited in claim 1 wherein determining is performed by one of the plurality of server nodes.

8. The method recited in claim 7 wherein the communications system further comprises a network operations center coupled to the plurality of server nodes, the method further comprising:

the one of the plurality of server nodes communicating to the network operations center a determination of a communications link having optimum quality.

9. The method recited in claim 8 wherein the communications system further comprises an additional communications link between the network operations center and the plurality of server nodes, and wherein the one of the plurality of server nodes uses the additional communications link to communicate the determination to the network operations center.

10. The method recited in claim 8, the method further comprising:

the network operations center overriding the determination; and the network operations center ordering the at least one subscriber unit to use a communications link that does not have optimum quality instead of using the communications link having the optimum quality.

11. The method recited in claim 1 wherein the communications system further comprises a network operations center coupled to the plurality of server nodes, the method further comprising:

the network operations center performing the determining.

12. The method recited in claim 11, the method further comprising:

the network operations center communicating to one of the plurality of server nodes a determination of a communications link having optimum quality.

13. The method recited in claim 1 wherein quality involves at least one of the group including signal strength, bit error rate, and block error rate.

14. A network control node for use in a wireless communications system having a subscriber unit communicating with a plurality of server nodes on first and second wireless communications links, the server nodes periodically transmitting indications of quality of communications with each of the subscriber units over their respective communications links, the network control node comprising:

a receiver configured to receive each of the periodically transmitted indications of quality of communications from the server nodes over a third wireless communications link; and a module to store the indications, the module including a data processing system that includes a processing element and a memory, the data processing system operable to execute at least one computer program stored in the memory to control communications between the subscriber unit and the server nodes, the at least one computer program when executed comprising the operations of:

establishing one of the first and second wireless communications links as an active link between the at least one subscriber unit and one of the plurality of server nodes;

periodically determining whether the active link provides superior quality of communications compared with the other of the first and second wireless communications links;

evaluating the results of the determining operation according to criteria to determine if an override is necessary to prevent overloading one of the server nodes;

ordering subsequent communications with the subscriber unit to be over the active link having the optimum quality if an override is not necessary, and otherwise selecting the other of the first and second wireless communications links; and continuously performing the measuring, determining and evaluating operations to thereby assign the other of the first and second wireless communication links when the active communications link is yielded in response to the evaluating operation.

15. The network control node recited in claim 14, and further comprising a transmitter, and wherein the at least one computer program when executed comprises an additional operation of:

transmitting over the third communications link an order to one of the server nodes to perform the ordering.

16. The network control node recited in claim 14, wherein the at least one computer program when executed comprises an additional operation of:

controlling the subscriber unit to perform the ordering.

17. A server node for use in a wireless communications system having a plurality of subscriber units and a network control node, the server node comprising:

at les one transceiver to periodically establish a wireless communication with one of the plurality of subscriber units over a plurality of first wireless communications links;

an element to periodically provide an indication of quality of communications between the server node and the one of the plurality of subscriber units on each of the first communications links;

the at least one transceiver communicating the periodically provided indication of quality to the network control node over a second wireless communications link; and a data processing system that includes a processing element and a memos the data processing system operable to execute at least one computer program stored in the memory to measure the indication of quality on each of the first wireless communications links, the at least one computer program when executed comprising the operations of:

establishing one of the first less communications links as an active link between the server node and the one of the plurality of subscriber units;

determining whether the active link provides superior quality of communications compared with others of the plurality of first wireless communications links;

evaluating the results of the determining operation according to criteria to identify an optimal link of the plurality of first wireless communications links and to determine if an override is necessary to prevent overloading the server node;

ordering subsequent communications with the one of the plurality of subscriber units to be over the optimal link if an override is not necessary, and otherwise selecting another of the plurality of first wireless communications links as the active link; and continuously performing the measuring, determining and evaluating operations to thereby assign a new one of the first wireless communications links when the active link is yielded in response to the evaluating operation.

18. The server node recited in claim 17 wherein the at least one computer program when executed further comprises the operations of:

measuring quality of communications on each of the first communications links using one technique from the group including signal strength, bit error rate, and block error rate; and determining which technique provides optimum quality.

19. The server node recited in claim 18 wherein the at least one computer program when executed comprises the additional operations of:

determining whether each of the first communications links is currently active;

if so, performing the measuring; and if not, initiating a communications exchange with one of the subscriber units over the non-active first communications link, and subsequently performing the measuring.

20. The method recited in claim 1 wherein the criteria comprises one of the group consisting of seniority, priority, prediction and capacity.

* * * * *

UNITED STATES PATENT AND TRADEMARK OFFICE
CERTIFICATE OF CORRECTION

PATENT NO. : 6,847,997 B1
DATED : January 25, 2005
INVENTOR(S) : Norbert Kleiner It is certified that error appears in the above-identified patent and that said Letters Patent is hereby corrected as shown below:

Column 10,
Line 6, replace "deter" with -- determining --.

Column 11,
Line 52, replace "les" with -- least --.

Column 12,
Line 8, replace "memos" with -- memory --.

Signed and Sealed this

Twenty-seventh Day of December, 2005

JON W. DUDAS
*Director of the United States Patent and Trademark Office*